March 18, 1969  C. E. KURTZ  3,433,035
HYDRAULIC TRANSMISSION FOR FABRIC-TREATING MACHINES
Filed Aug. 7, 1967
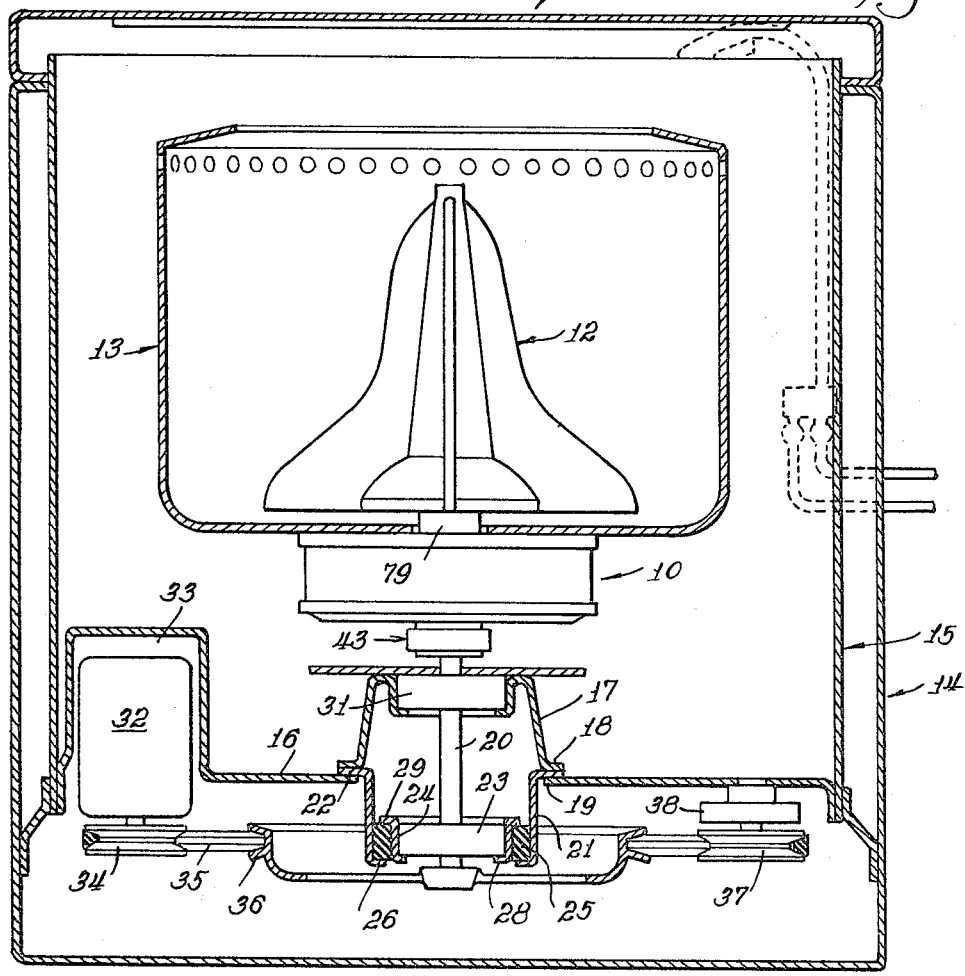
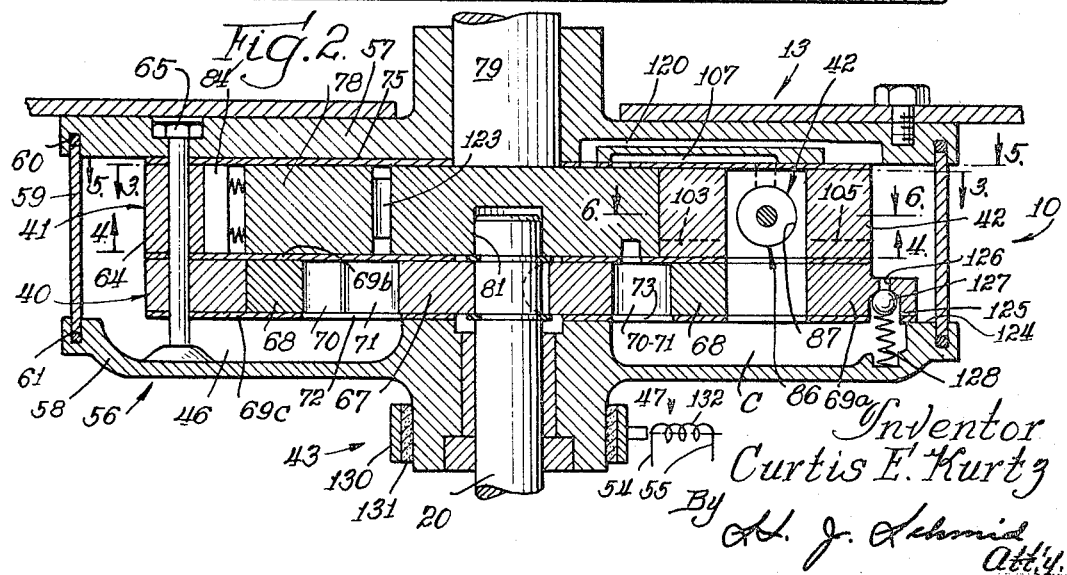
Inventor
Curtis E. Kurtz

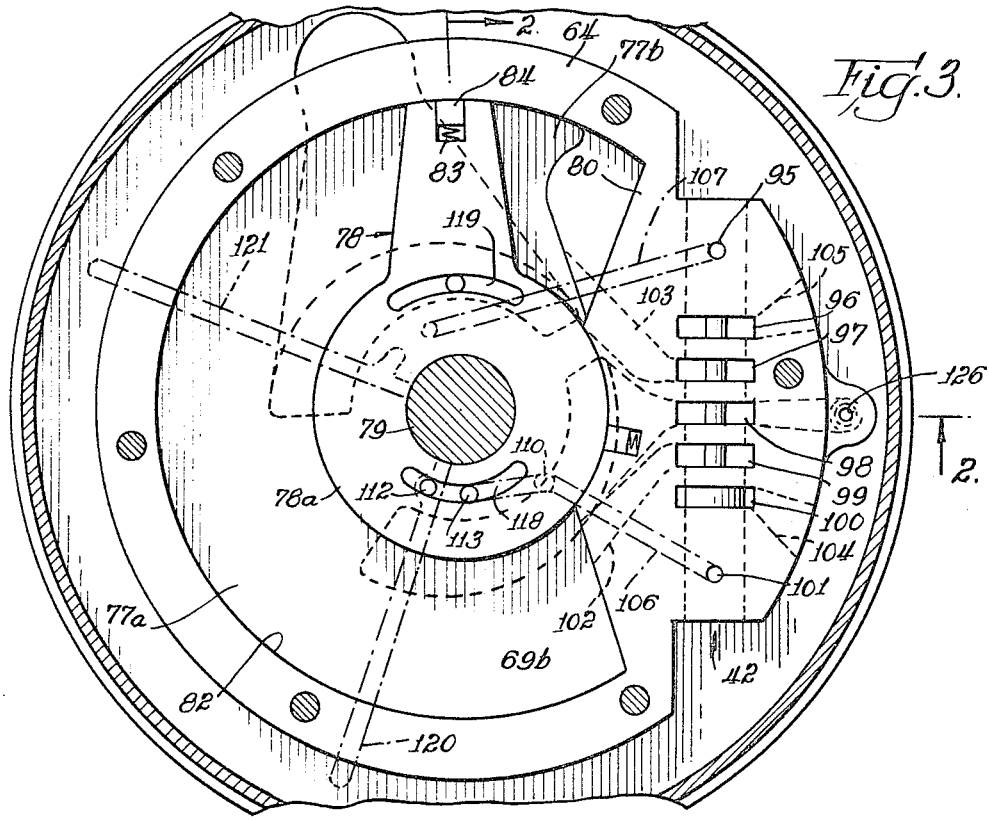
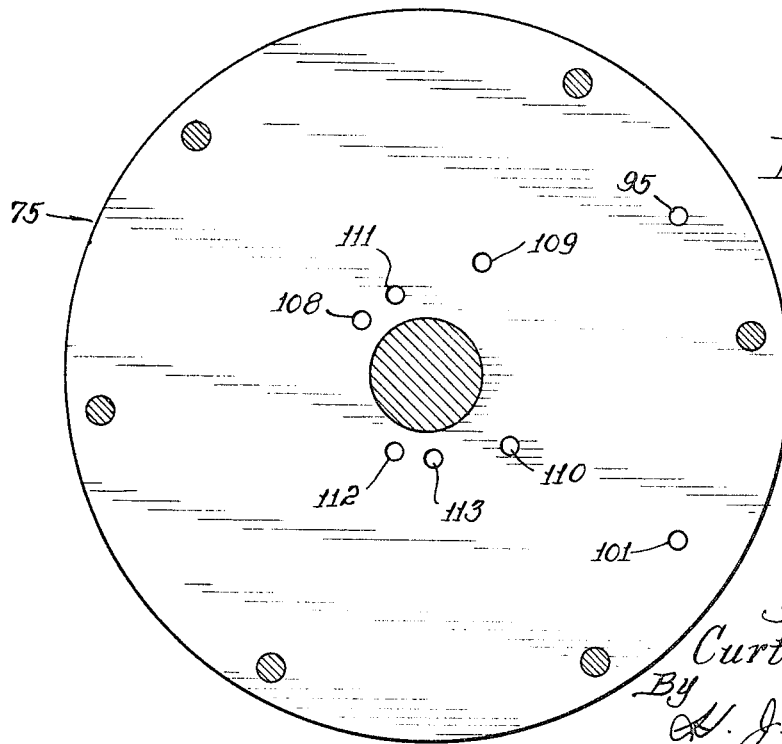

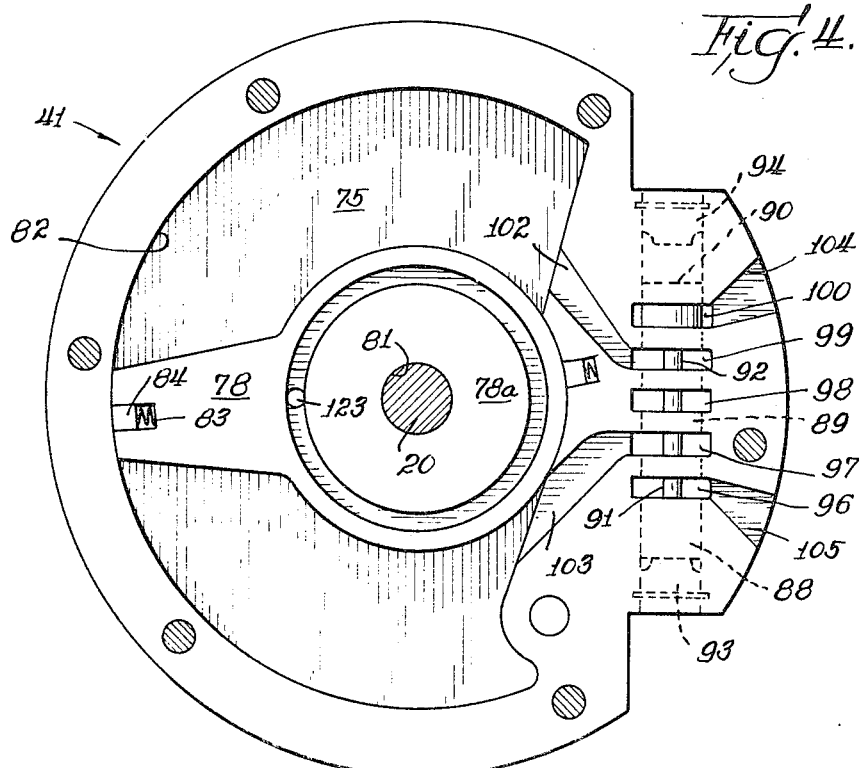

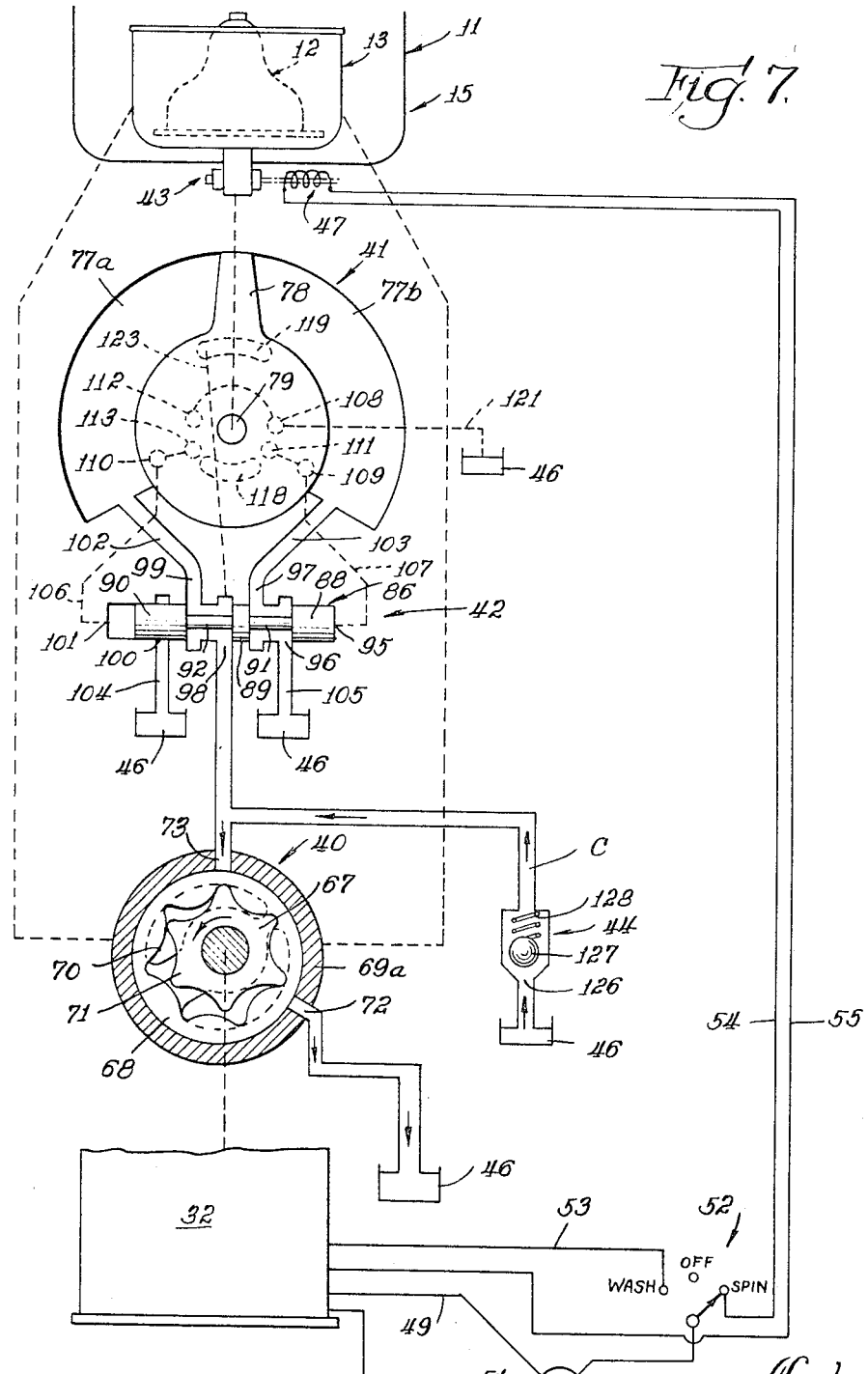

United States Patent Office 3,433,035
Patented Mar. 18, 1969

3,433,035
HYDRAULIC TRANSMISSION FOR FABRIC-TREATING MACHINES
Curtis E. Kurtz, Arlington Heights, Ill., assignor to Borg-Warner Corporation, Chicago, Ill., a corporation of Illinois
Filed Aug. 7, 1967, Ser. No. 658,780
U.S. Cl. 68—23     15 Claims
Int. Cl. D06f 23/04

ABSTRACT OF THE DISCLOSURE

A transmission for operating an agitator and rotating a clothes container and having a container brake; a pump comprising a housing connected to the container, a pumping element rotatable to supply fluid to an agitator-operating hydraulic motor and contra-rotatable, upon brake release, to discharge fluid through a check valve open to sump to initiate unrestricted fluid flow through the pump to the sump for high reaction torque providing high container acceleration and, as relative rotation of pumping element and housing equalizes, flow and reaction torque diminish until internal pump parts friction alone provides high speed container rotation.

Summary of the invention

This invention relates to a hydraulic transmission for fabric-treating machines.

An object of the invention is to provide an improved hydraulic transmission for fabric-treating machines having a rotatable fabric container, the transmission having a pump with relatively rotating driving and driven pump elements with the driven element being connected to the container, and having control means operable to provide for discharge of the pump fluid to a sump without restriction thereby to initiate rotation and high acceleration of the container due to the pump flowing near its full capacity with high reaction torque on the container, and thereafter relative rotation of the pump elements diminishing with consequent reduction in the flow and reaction torque so that the friction of the internal pump parts causes rotation of the container at approximately the speed of the driving pump member.

Another object of the invention is to provide an improved hydraulic transmission for fabric-treating machines employing a rotatable clothes container, the transmission having a pump including a pumping element, and housing therefor connected to the container, and a check valve adapted to be opened to permit the continuous flow of hydraulic fluid through the pump to the sump without restriction to provide an initial near capacity flow of the pump with high reaction torque of the pump and high acceleration of the container, subsequent relative rotation of the pumping element and housing diminishing as the check valve throttles the flow and the reaction torque decreases providing rotation of the container at high speed solely by the frictional engagement of the pump parts.

Another object of the invention is to provide an improved hydraulic transmission for fabric-treating machines having an oscillatable agitator in a clothes container, and a brake for preventing rotation of the container during agitator-oscillation, the transmission having a pump with relatively rotatable pump elements with one of the elements being connected to the basket, a reversible electric motor connected to another pump element, a hydraulic motor connected to the agitator, valve means controlled by the agitator and controlling operation of the hydraulic motor to oscillate the agitator when the electric motor is operated in a first direction of rotation, and other valving operable to discharge the pump fluid to the sump without restriction, during brake release and rotation of the electric motor in the opposite direction, to provide an initial near full capacity flow of the pump with consequent high reaction torque of the pump for high acceleration of the container and, as the relative rotation of the pump elements diminishes by the flow and reaction torque decreasing, the container is rotated at high speed by the frictional engagement of the pump parts.

Another object of the invention is to provide improved hydraulic transmission for fabric-treating machines having an oscillatable agitator in a rotatable clothes container, and a brake for preventing rotation of the container during agitator-oscillation, the transmission having a hydraulic motor connected to the agitator, a pump having a rotatable pump element and housing element therefor, the pump element directing fluid to the hydraulic motor for oscillating the agitator, the housing element being connected to the container, a check valve closable, during the operation of the hydraulic motor, and opened, during brake release, to permit unrestricted discharge of the pumped fluid to the sump with consequent initial near full capacity flow of the pump providing high reaction torque on the pump housing and thereby high acceleration of the container and, as the flow and reaction torque decreases and relative rotation of the pump and housing elements diminish, container rotation at high speed is effected solely by the frictional engagement of the pump and housing elements.

Further objects and advantages of the invention will become apparent from the following description with reference to the accompanying drawings, the features of novelty characterizing the invention being pointed out particularly in the claims annexed to and forming part of this specification.

Brief description of the drawings

In the drawings:

FIG. 1 illustrates a clothes washer embodying a preferred form of the hydraulic transmission of the present invention;

FIG. 2 is a vertical sectional view of the transmission and showing a pump, vane motor, and valving of the transmission, said section being taken on line 2—2 of FIG. 3;

FIG. 3 is a horizontal view of the vane motor and portions of the valving of the transmission, taken on line 3—3 of FIG. 2;

FIG. 4 is a horizontal view taken on line 4—4 of FIG. 2 and illustrating the hydraulic vane motor and control valving therefor;

FIG. 5 is a horizontal view taken on line 5—5 of FIG. 2; and

FIG. 6 is a horizontal sectional view of the control valving, taken on line 6—6 of FIG. 2;

FIG. 7 is a schematic view illustrating the improved hydraulic transmission for a clothes washer.

Description of the preferred embodiment

Referring to FIG. 1, a preferred embodiment of my improved hydraulic transmission 10 is shown in a fabric-treating or clothes-cleaning machine in the form of a washer 11 having an oscillatable agitator 12 to wash the clothes and a clothes container or basket 13 rotatable to extract washing liquid from the clothes.

The washer comprises a cabinet or casing 14 supporting a water container or tub 15 enclosed at its bottom end by a bulkhead 16 and a flexible rubber inverted cup-shaped member 17 overlying a central opening in the bulkhead and having an annular flange 18 connected to the opening-defining peripheral edge 19 of the bulkhead and in water-sealing thereto.

The basket 13, agitator 12, transmission 10, and the transmission drive shaft 20, are supported on a cylindrical steel mounting member 21 having its upper peripheral edge defined by a flange 22 extending between and connected to the flange 18 of member 17 and bulkhead edge 19. More particularly, the drive shaft 20 extends through the members 21 and 17 and is rotatably mounted on the member 21 by a ball-bearing assembly 23. The bearing assembly 23 provides a radial and thrust bearing and, for this purpose, there is disposed between and engaging the outer race 24 of the assembly 23 and the inner cylindrical surface of the member 21, an annular resilient bushing 25 of rubber or the like. The bushing 25 is mounted on a radially inwardly directed annular peripheral flange 26 of the member 21. The outer race 24 is substantially Z-shaped in cross section with its lower inwardly extending annular flange 28 thereof engaging the bottom of the bushing and the top flange 29 overlying the top of the bushing. It will be apparent that the described mounting arrangement provides for the basket, agitator, transmission and its drive shaft, being flexibly and solely supported at a point near the lower end of the drive shaft. Disposed within the upper opening of the flexible member 17 and surrounding the drive shaft 20 is a roller-bearing assembly 31, the member 17 having a cylindrical flange engaging the outer race of the assembly 31, the inner race of the assembly being secured to the drive shaft. The flexible member 17 is effective to vertically align the bearing assemblies 23 and 31 and resistively permits gyratory movement of the basket, agitator and transmission, about the lower end of the drive shaft due to an unbalance load during rotation of the basket.

The drive shaft is connected to a reversible electric motor 32 supported on the cabinet and extending upwardly into a pocket 33 formed in the bulkhead 16. The motor 32 has a drive pulley 34 connected by a belt 35 to a pulley 36, secured to the end of the drive shaft 20, and to a pulley 37 connected to a water pump 38 provided for exhausting water from the tub through an opening in the bulkhead 16 during rotation of the motor.

Referring to the improved hydraulic transmission, and specifically to FIGS. 1–7, inclusive, illustrating a preferred embodiment of the invention, the important elements of the hydraulic transmission are a reversible fluid pump 40 having its housing connected to the basket; a vane-type hydraulic motor 41 for driving the agitator; control valving 42 (FIGS. 3 and 6) for the motor 41; a solenoid-controlled brake 43 for the basket 13; and spin-control valve 44.

A fluid sump 46 is provided which is illustrated for convenience in various places in the schematic view of FIG. 7, although, in actual construction, one fluid sump 46 is provided into which all of the exhaust connections for various elements of the transmission exhaust pressure. In FIG. 7, electric conductors 49 and 50 interconnect a source of power 51 with motor 32, the conductor 50 being a ground conductor. The cycle selector switch 52 is connected to the motor by a conductor 53. The switch 52 is schematically illustrated in a simplified form although in the washer installation the cycle selection would be performed by a sequential controller or timer well known in the art. Conductors 54 and 55 connect the brake solenoid 47 to the switch 52.

Referring now more particularly to the transmission components, FIGS. 1–6 illustrate the structural components and their assembly in the transmission, while FIG. 7 schematically identifies the components in their operative relation to each other and to the agitator and basket and the drive motor and with particular reference to the fluid passages interconnecting the components in the performance of their functions in controlling oscillating movement of the agitator and rotation of the basket.

In general, and as shown in FIGS. 1–6, the transmission structure comprises a unitary assembly adapted to be drivingly connected to the agitator 12 and to the basket 13 at its upper end and to the drive shaft 20 at its lower end. More particularly, and as shown in FIG. 2, the transmission structure comprises a housing 56 provided by top and bottom annular plates 57 and 58, and a cylindrical collar 59 extending between the plates and having their top and bottom edges received within circular grooves 60, 61 respectively formed in the plates to provide the sump or reservoir 46 for the hydraulic fluid. Seals are positioned in the grooves and engage the collar to contain the fluid in the sump. The housing 56 contains, and its top and bottom plates 57 and 58 confine, the operating components of the transmission including the vane motor 41 having a housing 64; control valve 42 in a portion of housing 64; and the pump 40. A plurality of bolts 65 extend through and connect the plates 57 and 58, the vane motor and valve housing 64 to confine the vane motor 41, the valve assembly 42 and pump 40 therebetween.

The pump 40 is a conventional positive displacement pump of the gerotor type having (FIGS. 2 and 7) an inner rotor 67 keyed to the drive shaft 20, and an outer rotor 68 rotatable in a housing. The housing comprises a cylindrical ring 69a surrounding the rotors, and top and bottom plates 69b and 69c. The outer rotor 68 is provided with recesses 70 therein adapted to receive the teeth 71 on the inner rotor 67. As seen in FIG. 7, rotation of the rotor in a clockwise direction, during the agitate cycle, causes fluid to enter the pump through the port 72 (FIGS. 2 and 7) in the housing plate 69c and, in a well-known manner, will act in the fluid chambers between the teeth 71 of the inner rotor and the recesses 70 of the outer rotor to provide fluid under pressure to a port 73 in the housing plate 69c. Upon rotation of the rotors in a counterclockwise direction, the rotors are effective to cause fluid to enter the pump through port 73 and to provide fluid under pressure to port 72.

The vane-type hydraulic motor 41 is shown structurally in FIGS. 2, 3, 4, and 6, and schematically in FIG. 7 and comprises the housing or body 64, defining with a top fluid-passage plate 75 and plate 69b, a fluid chamber in which is received the vane 78 connected to the agitator shaft 79. The body 64 has a wall 80 projecting radially inwardly into the chamber and dividing the chamber into two portions 77a and 77b. The wall 80 has its apex formed arcuately concave to engage the cylindrical side portion of the vane hub 78a to provide, with the vane, the expansible and contractible fluid chambers 77a and 77b. The vane 78 reciprocates as fluid under pressure is admitted alternately to opposite sides thereof into the chamber portions 77a and 77b to oscillate the agitator during the washing cycle. As seen in FIG. 2, the vane is formed integral with the agitator shaft 79 journalled in the top cover plate 57, a portion of the pump inner rotor shaft 20 projecting into a central axial opening 81 in the vane. The vane has an arcuate tip conforming to the cylindrical interior surface 82 of the body 64 and, as shown in FIG. 3, the tip is provided with a recess receiving a spring 83 and plunger 84, the spring actuating the plunger into engagement with the surface 82 to preclude fluid flow between the chamber portions 77a and 77b. It may be noted that the top cover plate 57, plates 75 and 69b, and vane 78, contain various fluid ports and passages cooperating with ports and passages in the vane motor housing 64, in a manner later to be described.

As seen in FIGS. 2 and 7, the top surface of the hub 78a of the vane 78 is provided with two radially-spaced arcuate grooves 118 and 119 adapted to be connected to conduits 106 and 107. As seen in FIG. 2, the plate 75 is positioned between and its top side contacts the bottom of the plate 57 and its bottom side contacts the vane and housing of the vane motor. To afford fluid communication between the valve 86 and vane motor fluid chambers, the plate 75, as seen in FIGS. 3 and 5, is provided with circular openings 108, 109, 110, 111, 112, 113. The openings 108, 111, 112, 113 are located to communicate with and to be connectible to the arcuate groove 118 in the vane hub 78a (FIGS. 3 and 7). The openings 109 and 110 are located to be connectible to the arcuate groove 119 in the vane hub 78a (FIGS. 3 and 7). The openings 111 and 113 are located respectively at the radially inner ends of the passages 106 and 107 of the valve housing and are connectible to the arcuate groove 118 in the vane hub 78a. The openings 112 and 108 are located respectively above passages 120 and 121 of the valve housing, which connect to the sump 46.

The bottom of the vane hub 78a engages the top of plate 69b and is provided with a circular groove 122, the vane hub 78a having a passage 123 extending therethrough (FIG. 2) terminating at its upper end in the groove 119 and its lower end being disposed above port 73 to receive fluid under pressure from the pump which flows simultaneously into the passage 123 and port 73.

The passage 106 in the valve housing function via port 101 to exhaust fluid from one end of the valve spool while fluid under pressure is admitted by passage 107 and port 95 to the other end of the spool to shift the spool and thereby cause fluid under pressure from the pump to flow to port 97 and passage 103 to chamber 77b of the vane housing. The passage 107 in the valve housing functions via port 95 to exhaust fluid from the other end of the valve spool which fluid under pressure is admitted by passage 106 and port 101 to the other end of the spool to shift the spool and thereby cause fluid under pressure from the pump to flow to port 99 and passage 102 to chamber 77a of the vane housing. In this manner, the vane motor controls the operation of the spool to direct fluid to, and exhaust fluid from, the motor chambers 77a and 77b to oscillate the vane.

A feature of the present invention is shown in FIG. 2 disclosing the check valve 44 in housing 69a and located in a projecting portion thereof extending into the sump 46, and engaged with plate 69c which is in sealing relation therewith and with a shoulder 124 of the transmission housing bottom plate 58, this projecting portion providing a valve chamber 125. The chamber 125 is cylindrical and has an opening 126 in the top thereof connecting the pump fluid passage in plate 58 with the sump 46. The opening 126 is closed by a ball 127, under pressure of a spring 128 seated on the plate 58, to prevent flow of fluid under pressure from the pump to the sump. This check valve is operative, during pump operation in a clockwise direction (FIG. 7), to insure the flow of fluid under pressure to the agitator control valve 42 and vane motor 64 for oscillation of the agitator. When the pump operation is in a counterclockwise direction, the pump suction causes the check valve to open to draw fluid from the sump 46, through the check valve, port 73 of the pump, the pump, port 72 of the pump, to the sump for a purpose to be later described.

Referring to FIGS. 1 and 2, the transmission housing top plate 57 contacts the bottom wall of the basket 13 and is secured thereto by bolts extending through the basket wall and into the top plate 57 so that the transmission housing is secured to the basket. To prevent rotation of the basket and transmission during the washing-agitate operation, the hub of the transmission plate 58 is provided with the brake 43 comprising a brake band 130 having a friction lining 131 normally engaged with the hub to prevent rotation of the basket. The brake is released by the solenoid 47 having its winding 132 connected to conductors 54 and 55 (FIG. 7) providing an energizing circuit upon movement of the switch 52 to its "Spin" position.

The vane motor housing 64, as shown in FIGS. 3, 4, 6 and 7, contains the agitator control valve 42 including a spool 86 reciprocable in a tangential bore 87 in the housing under the influence of fluid pressure controlled by the vane 78 to direct fluid under pressure into one of the chamber portions 77a or 77b while simultaneously exhausting the fluid in the other chamber portion, to reciprocate the vane. More particularly, the spool 86 is provided with lands 88, 89, and 90, the lands 88 and 89 being separated by a groove 91 and the lands 89 and 90 being separated by a groove 92. The ends of the bore are provided with plugs 93 and 94. The spool is shiftable in the bore 87 by fluid under pressure supplied successively to opposite ends of the spool.

Referring to FIGS. 2, 3, 4, 6 and 7, the area of the valve body around the valve 86 includes ports 95, 96, 97, 98, 99, 100, and 101. Fluid conduits 102 and 103 are respectively connected to chambers 77a and 77b, and to ports 99 and 97. Conduits 104 and 105 are connected to ports 100 and 96, respectively, and are exhaust passages connected to the sump 46. Conduits 106 and 107 are connected to ports 101 and 95, respectively.

Reference is now made to the schematic disclosure in FIG. 7 for an explanation of the operation of the transmission. In FIG. 7, the electric motor 32 is energized and rotates the drive shaft 20 and the pump rotors 67 and 68 in a clockwise direction to provide fluid under pressure to the valve 42, and thereby to the vane motor 41, the check valve 44 being closed. Suction of the pump causes fluid to be drawn from the sump 46 into the port 72 of the pump. Control of the direction of rotation of the motor is provided by positioning the movable member of switch 52 in engagement with the switch contact "WASH" to provide current flow through the motor windings in well-known manner.

The spool 86 of valve 42 controls pressure fluid flowing from port 73 of the pump through port 98 of the valve and directs the fluid through groove 92 of the valve spool, port 99, passage 102, into the chamber portion 77a of the vane motor to effect movement of the vane 78 in a clockwise direction. At this time, the fluid in chamber 77b flows through passage 103 and port 97 to port 96 and passage 105 to the sump. When the vane moves to the position shown in FIG. 3, the vane has its groove 119 connecting passage 123 to port 109, passage 107, port 95, to the valve chamber so that fluid under pressure causes spool 86 to be moved to the left. Fluid is exhausted from the left end of the spool via port 101, passage 106 and 118 to port 112, passage 120 to the sump 46. Upon movement of the spool 86 to the end of its travel, fluid under pressure flows from port 98 to port 97, passage 103 into chamber 77b causing vane 78 to be moved in a counterclockwise direction. At this time, fluid in chamber 77a is exhausted through passage 102, ports 99 and 100 to passage 104 and sump 46. As the vane rotates to a position where the end of vane groove 119 covers port 110, fluid under pressure from port 123 flows through passage 106 and port 101 to the left end of spool 86 to move the spool to the position shown in FIG. 3. Simultaneously, the groove 118 of spool 86 is in registry with ports 111 and 108 so that the fluid is exhausted from the right end of the spool through port 95, passage 107, port 111, groove 118, port 108 and passage 121 to the sump.

It will be apparent from the above description that the vane motor is controlled to provide oscillating movement of the vane, and thereby the agitator, during the washing operation.

To effect rotation of the basket during the spin-extract cycle, movable contact member of the switch 52 is moved from its "WASH" position to its "SPIN" position to control electric circuits to the motor 32 to reverse the direction of rotation of the motor and thereby the pump rotors 67 and 68 in a counterclockwise direction (FIG. 7). As a result, the solenoid windings are energized, via conductors 54 and 55, to cause the brake 43 to release its engagement of the hub of plate 58. Also, the pump is effective to provide fluid under pressure to port 72 of its housing and, as fluid is drawn in through port 73, the suction imparted to the fluid in the closed fluid chamber C (FIG. 2), provided by plates 69c and 58, is effective to cause ball 127 of check valve 44 to be withdrawn from opening 126, against the closing action of spring 128, to permit fluid in the sump 46 to flow into the chamber C and into the pump. As a result, the fluid is circulated by the pump from sump 46, opening 126 of the valve 44, chamber C, intake port 73 of the pump, through the pump and from the pressure port 72 of the pump to the sump 46.

As the fluid is allowed to freely recirculate through the valve housing and pump, and the brake is released, the pump reaction and the mechanical friction of the pump components causes coupling of the drive shaft 20, through the transmission housing and pump, to the basket to cause the basket to spin at the desired speed to extract the water from the clothes in the basket. During the initial spin period, the pump is flowing near its full capacity with a high reaction torque for high acceleration. As the capacity of the pump decreases and the spin relation between the pump elements and the housing approaches zero, the flow and reaction torque decreases, and the internal pump components' friction cause the transmission and thereby the basket to attain the desired spin speed approximating the speed of rotation of the drive shaft 20.

It will be apparent from the description of the hydraulic transmission of the present invention that an important inventive feature resides in the provision of the pump having its housing element, for its pumping element, connected to the clothes container of a fabric-treating machine, and a fluid circuit for the pump and having valving controlling flow of fluid through the circuit and operative to provide for the unrestricted fluid flow through the pump and discharge from the pump to hydraulically couple the pumping and housing elements together to thereby effect a reaction torque in the pump operative to rotate the container by the housing element providing a substantially direct drive connection between the electric motor drive shaft and the container. The unrestricted fluid discharge from the pump near its full capacity by opening of the control valving is of considerable value in providing a high torque reaction for initiating rotation of the basket, due to the inertia of its load of wet fabrics, and increasing acceleration of the speed of rotation of the basket. As the relative speeds of the drive shaft and container approaches zero, the flow and reaction torque diminish and the desired spin speed is provided by the internal pump and parts friction.

Although a pump of the gerotor or gear type has been shown to illustrate the present invention, obviously other positive displacement or expansible chamber type pumps, including vane pumps, can also function satisfactorily and be used in practising the invention.

While I have shown and described certain presently preferred embodiments of the invention, it will be understood that the invention is not limited thereto since the invention may be embodied within the scope of the appended claims.

What is claimed is:

1. In a fabric-treating machine, a rotatable fabric container; a motor having a rotatable drive shaft; a hydraulic pump including relatively rotatable elements including a pumping element and a housing element therefor, one of said elements being connected to said drive shaft and the other element being connected to said container; and control means for initiating continuous circulation of fluid by and through said pump to induce a reaction torque on the pump element, connected to said container, operative to rotate said container.

2. In a fabric-treating machine, a rotatable fabric container; a motor having a rotatable drive member; a hydraulic pump including a pumping element connected to said drive member, and a housing element for said pumping element and connected to said container; and control means for initiating circulation of fluid by and through said pump to induce a reaction torque on said housing element operative to rotate said housing element and thereby said container.

3. In a fabric-treating machine as defined in claim 2 wherein said control means includes normally-closed valve means which open, at the initiation of operation of said pumping element, to provide for continuous fluid flow through said pump to thereby induce maximum reaction torque on said housing element for accelerating the speed of rotation of said housing element and thereby said container, said valve means thereafter being gradually closable to diminish fluid flow and thereby the reaction torque on said housing element by said pumping element, to provide a substantially direct drive between said drive member and container.

4. In a fabric-treating machine as defined in claim 3 wherein said pumping and housing elements are hydraulically coupled and frictionally engaged to connect said elements for direct drive upon closing of said valve means.

5. In a fabric-treating machine as defined in claim 2 wherein the pump has its intake and discharge ports in a fluid circuit including a sump, and said control means is a check valve in said circuit and located between said sump and one of said pump ports.

6. In a fabric-treating machine as defined in claim 2 wherein the pump has its intake and discharge ports in a fluid circuit including a sump, and said control means is a check valve in said circuit and located between said sump and said pump intake port.

7. In a fabric-treating machine as defined in claim 2 wherein said pump is the gerotor type, the pumping element being an externally toothed gear connected to the drive member and meshing with an internally toothed ring gear rotatable in the housing element connected to the container.

8. In a fabric-treating machine, a rotatable fabric container; an agitator in said container; an electric reversible motor having a drive shaft; driving means for said agitator and operative to actuate said agitator when said motor is operated in a first direction of rotation; driving means for said container and including a pump having a pumping element and a housing element therefor, said housing element being connected to said container and said pumping element being connected to said drive shaft; and control means for initiating circulation of fluid by and through said pump to induce a reaction torque on said housing element operative to rotate said housing element and thereby said container when said motor is operated in a second direction of rotation.

9. In a fabric-treating machine as defined in claim 8 wherein the pump has its intake and discharge ports in a fluid circuit including a sump, and said control means is a check valve in said circuit and located between said sump and said pump intake port.

10. In a fabric-treating machine as defined in claim 8 wherein said control means includes normally-closed valve means which open, at the initiation of operation of said pumping element, to provide for continuous fluid flow through said pump to thereby induce maximum reaction torque on said housing element for accelerating the speed of rotation of said housing element and thereby said container, said valve means thereafter being gradually closable to diminish fluid flow and thereby the reaction torque on said housing element by said pumping element, to provide a substantially direct drive between said drive member and container.

11. In a fabric-treating machine as defined in claim 10 wherein said pump is the gerotor type, the pumping element being an externally toothed gear connected to the drive shaft and meshing with an internally toothed ring gear rotatable in the housing element connected to the container, said gears and said housing element being frictionally engaged to couple said gears to said housing element and thereby said drive shaft and said container for said direct drive upon closing of said valve means.

12. In a hydraulic drive arrangement for a clothes cleaning machine having a rotatable clothes container and an agitator in said container, the drive arrangement comprising a pump having a pumping element and a housing element therefor, said housing element being connected to said container; a reversible electric motor having a drive member connectible to said pumping element; a hydraulic motor connected to said agitator; first valve means controlling operation of said hydraulic motor to actuate said agitator when said electric motor, and thereby said pumping element, is operated in a first direction of rotation; means providing a fluid reservoir exteriorly of said pump; and control means for rotating said container by said pump and including second valve means between said pumping element and said reservoir and operable by suction of the pump to provide for unrestricted flow of fluid from said reservoir into, and discharge from, said pump to said reservoir, when said electric motor, and thereby said pumping element, is operated in a second direction of rotation, to induce a reaction torque by said pump on said housing element for rotating said housing element and thereby said container.

13. In a hydraulic drive arrangement as defined in claim 12 wherein said drive arrangement includes a device for preventing rotation of said container during operation of said hydraulic motor, said device being releasable during operation of said second valve means to permit rotation of said container by said housing element.

14. In a hydraulic drive arrangement as defined in claim 12 wherein said second valve means is a check valve closed during rotation of said pumping element in said first direction, and opened by pump suction during rotation of said pumping element in said second direction.

15. In a hydraulic drive arrangement as defined in claim 12 wherein said second valve means is a check valve which opens at the initiation of operation of said electric motor in said second direction of rotation, to provide for unrestricted fluid flow through said pump to induce maximum reaction torque on said housing element for accelerating the speed of rotation of said housing element and thereby said container, said check valve thereafter being gradually closable to diminish fluid flow and thereby the reaction torque on said housing element, to provide a substantially direct drive between said drive member and container.

References Cited

UNITED STATES PATENTS

| | | |
|---|---|---|
| 3,107,493 | 10/1963 | Huber. |
| 3,242,703 | 3/1966 | Brundage _____ 68—23 |
| 3,330,138 | 7/1967 | Flinn _____ 68—23 |
| 3,388,569 | 6/1968 | Kurtz _____ 60—53 XR |

EDGAR W. GEOGHEGAN, *Primary Examiner.*

U.S. Cl. X.R.

60—52, 53; 331—113